UNITED STATES PATENT OFFICE.

MARSHALL TURLEY, OF COUNCIL BLUFFS, IOWA.

IMPROVEMENT IN PRINTERS' INK.

Specification forming part of Letters Patent No. 113,947, dated April 18, 1871.

*To all whom it may concern:*

Be it known that I, MARSHALL TURLEY, of Council Bluffs, in the county of Pottawattamie, and in the State of Iowa, have invented certain new and useful Improvements in Process for Making Printers' Ink; and do hereby declare that the following is a full, clear, and exact description thereof.

The nature of my invention consists in a new mode of manufacturing printers' ink, as will be hereinafter more fully set forth.

Resin is placed in a retort or other suitable vessel, and heated until the pressure is about ten or fifteen pounds to the square inch. Soot or lamp-black made from burning tar from stone-coal is then added and well mixed while all is hot.

The heat changes the nature of the resin, and the lime in the soot or lamp-black has a tendency to hold the resin in a viscid state, just right for the ink, and all is ready for grinding.

I do not confine myself to the coloring-matter made from the coal-tar, for I can use any of the lamp-blacks.

For newspaper ink I put about one pound of concentrated lye dissolved in about three gallons of water to two hundred pounds of the ink made as above described. This makes the ink thinner and not so viscid; it leaves the type clean, and is of a finer black.

For book or job ink I put in about one pound of sulphuric acid to twenty or forty pounds of the ink, as the ink requires, and it gives the ink more body and a brighter ink.

Thus it will be seen that by means of alkalies and acids I control the ink as it is used for different jobs.

Having thus fully described my invention, what I claim as new, and desire to secure by Letters Patent, is—

1. The above-described process of preparing printers' ink, consisting of the heating and mixing of resin and lamp-black or soot, substantially as herein set forth.

2. As a new article of manufacture, printers' ink formed of resin and soot or lamp-black, in the manner herein set forth.

3. As a new article of manufacture, printers' ink composed of resin, soot or lamp-black, and alkali, as herein set forth.

4. As a new article of manufacture, printers' ink composed of resin, soot or lamp-black, and acid, as herein set forth.

In testimony that I claim the foregoing I have hereunto set my hand this 26th day of December, 1870.

MARSHALL TURLEY.

Witnesses:
E. W. JACKSON,
C. F. BROWNOLD.